(12) United States Patent
Moya

(10) Patent No.: US 7,112,363 B2
(45) Date of Patent: Sep. 26, 2006

(54) POROUS OR NON-POROUS SUBSTRATE COATED WITH A POLYMERIC COMPOSITION HAVING HYDROPHILIC FUNCTIONAL GROUPS AND PROCESS

(75) Inventor: Wilson Moya, Concord, MA (US)

(73) Assignee: Entegris, Inc., Chaska, MN (US)

( * ) Notice: Subject to any disclaimer, the term of this patent is extended or adjusted under 35 U.S.C. 154(b) by 197 days.

(21) Appl. No.: 10/203,269

(22) PCT Filed: Jan. 31, 2001

(86) PCT No.: PCT/US01/03129

§ 371 (c)(1),
(2), (4) Date: Oct. 3, 2002

(87) PCT Pub. No.: WO01/58577

PCT Pub. Date: Aug. 16, 2001

(65) Prior Publication Data

US 2003/0175523 A1 Sep. 18, 2003

(51) Int. Cl.
*B32B 5/18* (2006.01)
*B32B 27/26* (2006.01)

(52) U.S. Cl. ............................. 428/304.4; 428/319.3; 428/421

(58) Field of Classification Search ............ 428/304.4, 428/319.3, 421, 422
See application file for complete search history.

(56) References Cited

U.S. PATENT DOCUMENTS

| 4,113,912 | A |   | 9/1978 | Okita ..................... 442/118 |
|---|---|---|---|---|
| 4,347,268 | A | * | 8/1982 | Close ..................... 427/385.5 |
| 4,470,859 | A |   | 9/1984 | Benezra ..................... 156/155 |
| 4,820,588 | A | * | 4/1989 | Brinduse et al. ............ 428/422 |
| 5,086,123 | A | * | 2/1992 | Guenthner et al. ......... 525/276 |
| 5,137,633 | A |   | 8/1992 | Wang ......................... 210/490 |
| 5,217,802 | A | * | 6/1993 | Scarmoutzos ............ 428/304.4 |
| 5,320,888 | A | * | 6/1994 | Stevens ..................... 428/36.2 |

FOREIGN PATENT DOCUMENTS

EP 430082 6/1991

* cited by examiner

*Primary Examiner*—Ramsey Zacharia
(74) *Attorney, Agent, or Firm*—Timothy J. King; John E. Pillion; Paul J. Cook

(57) ABSTRACT

A crosslinked fluorocarbon such as perfluorocarbon, polymeric composition is provided having hydrophilic functional groups, which is crosslinked with fluorinated such as perfluorinated crosslinking groups. Also provided is a branched fluorocarbon such as perfluorocarbon, polymeric composition having hydrophilic functional groups.

25 Claims, No Drawings

POROUS OR NON-POROUS SUBSTRATE COATED WITH A POLYMERIC COMPOSITION HAVING HYDROPHILIC FUNCTIONAL GROUPS AND PROCESS

BACKGROUND OF THE INVENTION

1. Field of the Invention

This invention relates to a porous or non-porous substrate comprising a fluorine-containing polymer including a polyperfluorocarbon substrate having a surface with improved hydrophilic characteristics, comprising a branched fluorocarbon polymeric composition having hydrophilic functional groups or a crosslinked fluorocarbon polymeric composition having hydrophilic functional groups and to a process for forming the substrate having the improved hydrophilic characteristics. More particularly, this invention relates to a porous or non-porous substrate comprising a fluorine-containing polymer including a polyperfluorocarbon substrate having a surface with improved hydrophilic characteristics, comprising a branched fluorocarbon polymeric composition having hydrophilic functional groups or a crosslinked fluorocarbon polymeric composition having hydrophilic functional groups wherein the functional groups comprise sulfonyl methide, sulfonyl methane, amide, sulfonamide, imide or sulfonimide groups and to a process for forming the substrate having the improved hydrophilic characteristics 2. Description of the Prior Art Articles made of a fluorine-containing polymer including a polyperfluorocarbon substrate are useful in a wide variety of environments due to the chemical inertness of the substrate. By the term "polyperfluorocarbon" as used herein is meant a polymer comprising one or more perfluorocarbon monomers including homopolymers, copolymers, terpolymers, polymer blends or the like. Examples of polyperfluorocarbons include polytetrafluoroethylene, fluorinated ethylene-propylene copolymer (FEP) and perfluoroalkoxy polymer (PFA). These substrates are formed into a variety of shapes including non-porous films, beads, tubes, woven fibers, non-woven fibers, porous membranes, or the like.

Porous membrane filters are utilized in a wide variety of environments to separate materials within a fluid stream. Membranes are formed from a solid polymeric matrix and have highly precisely controlled and measurable porosity, pore size and thickness. In use, the membrane filters generally are incorporated into a device such as a cartridge, which in turn, is adapted to be inserted within a fluid stream to effect removal of particles, microorganisms or a solute from liquids and gases.

To be useful, membrane filters must be resistant to the fluid being filtered so that they maintains their strength, porosity, chemical integrity and cleanliness. In addition membrane filters must remain wetted with the process fluid in order to retain filtration efficiency. Polyperfluorocarbon-based membrane filters made from fluorine-containing polymers such as polytetrafluoroethylene, FEP or PFA are commonly utilized in these applications. Fluorine-containing polymers are well known for their chemical inertness, or excellent resistance to chemical attack.

One disadvantage of fluorine-containing polymers is that they are hydrophobic and therefore membranes made from such polymers are difficult to wet or to remain wet with aqueous fluids or other fluids which have a tendency to outgas. For example, in the manufacture of microelectronic circuits, membrane filters are used extensively to purify various outgassing process fluids to prevent contaminants from causing circuit failures. Thus it would be desirable to provide a membrane filter having improved hydrophilic properties, which does not dewet during filtration in order to retain filtration efficiency.

Dewetting of a fluorine-containing polymeric surface also is a problem with a non-porous surface such as a hollow tube wherein the formation of gases therein restricts or prevents the flow of an outgassing liquid therein.

When modifying a porous membrane surface for filtration applications, it is essential that the surface modification to impart improved hydrophilic characteristics be effected while maintaining desired fluid flow properties through the modified membrane. Thus, the membrane having its surface modified should retain sufficient porosity to permit its use as a filtration member. Accordingly the amount of surface modifying composition applied to the membrane surface must be controlled in order to retain porosity of the modified membrane. In contrast, when modifying a porous membrane for non-filtration applications such as in ion-exchange applications including electrodialysis, electrodeionization or the like, complete blockage of the membrane pores with the surface modifying composition is not a problem.

It has been proposed and U.S. Pat. No. 5,928,792 which is incorporated herein by reference to provide a process for modifying a surface of a porous membrane such as a perfluorocarbon membrane with a bound perfluorocarbon copolymer composition to render the entire surface non-dewetting.

PCT application WO 99/38897 discloses crosslinked sulfonated polymers and the process for preparing them.

U.S. Pat. No. 4,470,859 to Benezra et al, discloses a process for modifying the surfaces of microporous substrates formed of a fluorocarbon such as polytetrafluoroethylene, with a coating of an uncrosslinked perfluorocarbon copolymer composition including hydrophilic functional groups copolymer from a solution of the pefluorocarbon copolymer composition to render the surface of the membrane more water wettable. The perfluorocarbon copolymer composition is dissolved in a nonaqueous solvent at elevated temperature. The membrane then is immersed into the solution which, in turn, is placed into a vacuum chamber. The pressure within the chamber then is reduced such as to approximately 150 millimeters of mercury (absolute) to remove air from within the filter. Thereafter, the pressure within the chamber is quickly returned to atmospheric pressure. This coating process is repeated to ensure, what is described by Benezra et al., complete solution penetration into the pores of the membrane. By proceeding in this manner, the membrane surfaces and the interior walls defining the interstices within the membrane are coated with the perfluorocarbon copolymer composition. Following the coating step, the solvent is removed by evaporation using heat and vacuum, or the solvated perfluorocarbon copolymer composition is precipitated with a substance in which the perfluorocarbon copolymer composition is effectively insoluble. The solvents utilized to form the solution include halocarbon oil, perfluorooctanoic acid, decafluorobiphenyl, N-butylacetamide, and N,N-dimethylacetamide. Subsequent to modifying the membrane surface, Benezra et al, teaches avoiding the use of a fluid containing a solvent for the modifying perfluorocarbon polymer composition on the membrane surface. Benezra et al. also disclose that alcohol solutions for the perfluorocarbon polymer composition should be avoided.

U.S. Pat. No. 4,902,308 to Mallouk et al, also describes a process for modifying the surface of a porous, expanded polytetrafluoroethylene membrane with a perfluoro-cation exchange polymer from an organic solution of the polymer. Mallouk et al, also teaches that contact of the surface modified membrane with fluids containing a solvent for the polymer also should be avoided.

U.S. Pat. Nos. 4,259,226 and 4,327,010 disclose modifying a porous membrane surface with a fluorinated polymer having carboxylic acid salt groups. No process steps are disclosed for controlling extractables from the membrane or for controlling the extent of binding of the modifying composition to the membrane surface.

U.S. Pat. Nos. 5,183,545 and 5,094,895 disclose a process for making a multilayer, composite, porous diaphragm lrom a porous, multilayer, expanded polytetrafluoroethylene substrate having its surface modlified with an uncrosslinked perfluoro ion exchange polymer composition. The modifying polymer composition can contain a surfactant and may contain excess modifying composition, both of which are sources of undesirable extractables.

U.S. Pat. No. 5,874,616 to Howells et al discloses a process for making linear polymeric bis(fluoroalkylenesulfonyl)imides by reacting a difunctional fluoroalkylene sulfonamide compound with a difunctional fluoroalkylene sulfonyl halide compound. Since this process relies on the use of low molecular weight reactants to produce the polymer, it is difficult to control the molecular weight distribution of the final linear polymeric composition and therefore it is undesirable. In addition, the linear polymeric bis(fluoroalkylenesulfonyl)imides cannot be crosslinked.

U.S. Pat. No. 5,463,005 to Desmarteau discloses a process for forming a copolymer of tetrafluoroethylene (TFE) and a sulfonimide-containing unsaturated monomer wherein the monomer is derived from a sulfonimide-containing reagent. Since TFE is a toxic reagent, its use is undesirable. In addition, since this process relies on the use of low molecular weight unsaturated monomers, it is difficult to control the molecular weight distribution of the final polymeric composition.

It has been proposed by Shimazo in J. Electroanal. Chem. 258 (1998) pp. 49–59 to crosslink a perfluorocarbon copolymer composition such as Nafion™ films with radio frequency plasma. Crosslinking with a plasma is effected without the introduction of crosslinking groups. Crosslinking is effected through a bond linking two polymer chains. Unfortunately, ionizing radiation such as plasma degrades the perfluorocarbon copolymer composition.

It has been proposed by Greso et al in POLYMER vol. 38 No. 6 (1997), pp. 1345–1356 to crosslink a perfluorocarbon copolymer composition such as Nafion™ films via Si—O—Si bridges. This process is undesirable since the product contains a bound inorganic phase, which is chemically unstable.

It has been proposed by Covitch et al in Polymer Science and Technology Vol. 16, pp. 257–267 (1982) to crosslink a perfluorocarbon copolymer composition such as Nafion™ films with ethylenediamine and heat. This process is undesirable since the product contains a non-fluorinated ethylene portion, which is chemically unstable.

Accordingly, it would be desirable to provide a porous membrane formed from a fluorine-containing polymer having a surface with improved hydrophilic characteristics suitable for filtration applications. Such a porous membrane would be chemically and thermally stable and have a surface sufficiently hydrophilic to enable filtration while avoiding dewetting. In addition, it would be desirable to provide a non-porous membrane formed from an initially porous membrane formed from a fluorine-containing polymer having its pores filled with a fluorocarbon polymeric composition having hydrophilic functional groups. Such a non-porous membrane would be chemically and thermally stable and would permit the transport of ionic species therethrough. Furthermore, it would be desirable to provide a surface modified article formed from a non-porous fluorine-containing polymeric substrate having its surface modified with a fluorocarbon polymeric composition having hydrophilic functional groups. Such a non-porous article would be useful for processing outgassing liquids while avoiding dewetting of the surface.

SUMMARY OF THE INVENTION

This invention provides a porous or non-porous membrane or article formed from a fluorine-containing polymer substrate having its surface modified with a crosslinked or branched fluorocarbon, preferably perfluorinated, polymeric composition having hydrophilic functional groups to provide a surface with improved hydrophilic characteristics as compared to the unmodified substrate. The fluorine-containing polymer substrate can be a porous membrane or can be a non-porous article in any desired configuration such as a fiber, a woven or non-woven fabric formed from fibers, a mesh, a tube a flat sheet, a corrugated sheet, a conduit, beads, rods or the like.

In one embodiment, this invention provides a surface comprising a crosslinked perfluorocarbon polymeric composition, which is crosslinked with perfluorinated crosslinking groups. These crosslinked perfluorocarbon polymeric compositions are chemically stable in that they are perfluorinated and are crosslinked with perfluorinated linking moieties, which are stable against degradation by virtue of contact with highly reactive reagents such as liquid compositions containing a base such as ammonium hydroxide, an oxidizer such as hydrogen peroxide or ozone and water, having a pH greater than about 9 such as special cleaning (SC) solutions, for example SC1 used during the manufacture of electronic components. In contrast, crosslinking moieties containing non-perfluorinated organic groups become degraded upon contact with these reagents and these chemical crosslinks are destroyed so that the crosslinked polymer loses its original degree of crosslinking.

In one aspect of this invention a surface is provided comprising a branched fluorocarbon polymeric composition having hydrophilic functional groups wherein at least one hydrophilic functional group is a sulfonyl or carbonyl-containing group of the formula:

(1)

and which is a branch or side group covalently bonded through the $R_f$ group to a CY group of a fluorocarbon polymeric composition of the formula:

(2)

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; $R_f$ is a $C_1$–$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $Z^+$ is a proton or an organic or an inorganic cation and t can be 0 or 1; L is C, CH, or N; E is $R_f'T$- or $R_f'$-; G is $R_f'T$- or R, wherein R is hydrogen or a substituted or unsubstituted alkyl or aryl group and $R_f'$ is $C_1$–$C_{20}$ linear, cyclic or branched fluoroalkyl, preferably perfluoroalkyl, radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group.

In another aspect of this invention a surface comprising a branched fluorocarbon polymeric composition having hydrophilic functional groups is provided wherein at least one hydrophilic functional group is provided of the formulae:

(1a)

wherein L' is $C^-$ or CH, L" is H or $-TR_f"$; $R_f"$ is $C_1$–$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group; T, $Z^+$, t, $R_f$ and are defined above, or

(1b)

or

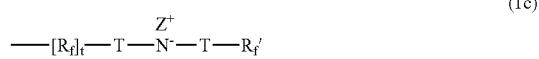
(1c)

and which is a branch or side group covalently bonded through the $R_f$ group to a CY group of a fluorocarbon polymeric composition of the formula:

(2)

wherein A, Y, $R_f$, T, R, $R_f'$, Z, n, m and t are defined above.

In another aspect of this invention, the surface-modifying composition comprising the branched fluorocarbon polymeric composition having hydrophilic functional groups of formula (1c) such as a sulfonimide composition of the formula:

(1d)

is prepared by reactng a fluorocarbon polymer precursor containing at least one pendant sulfonyl or carbonyl halide group having the formula:

(3)

wherein X is a halogen such as fluorine, chlorine, bromine or iodine and T and $R_f$ are defined above, with a substituted or unsubstituted amide or sulfonamideontaining reactant of the formula:

(4)

wherein R' is hydrogen or substituted or unsubstituted alkyl or aryl groups and T, R and $R_f'$ are defined above. Alternatively, an organic or inorganic salt of the amide or sulfonamide-containing reactant can be used, having the formula:

(5)

wherein T, R, $R_f'$ and $Z^+$ are defined above, or mixtures of reactants (4) and (5).

In another aspect of this invention, the surface-modifying composition comprising the branched fluorocarbon polymeric composition having hydrophilic functional groups of this invention is prepared by reacting a fluorocarbon polymer precursor containing at least one pendant substituted or unsubstituted amide or sulfonamide group having the formula:

(6)

wherein R, t, T, R' and $R_f'$ are defined above; alternatively, an organic or inorganic salt of the amide or sulfonamide group can be used, having the formula:

(7)

wherein R, t, T, $R_f$ and $Z^+$ are defined above, or mixtures thereof, with a sulfonyl or carbonyl halide-containing reactant of the formula:

(8)

wherein T, $R_f'$ and X are defined above. The fluorocarbon polymer precursor containing pendant amide or sulfonamide groups can be prepared by reacting the sulfonyl or carbonyl halide groups of a fluorocarbon polymer precursor having sulfonyl or carbonyl halide groups with anhydrous ammonia.

In another aspect of this invention, the surface comprising a crosslinked fluorocarbon, such as perfluorocarbon, polymeric composition having hydrophilic functional groups of this invention is provided having connecting bridges or crosslinks having sulfonyl or carbonyl-containing groups joining polymeric chains, which can include loops joining portions of a polymeric chain, such as compositions having the formula:

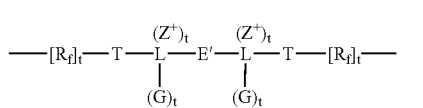     (9)

covalently bonded through the $R_f$ groups each to a CY group of a fluorocarbon polymeric composition of the formula:

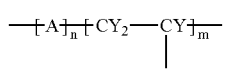     (2)

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; $R_f$ is a $C_1-C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $Z^+$ is a proton or an organic or an inorganic cation; t can be 0 or 1; L is C, CH or N; E' is -$TR_f''T$- or —$R_f'$—; G is $R_f'T$- or R; $R_f'$ is $C_1-C_{20}$ linear, cyclic or branched fluoroalkyl, preferably perfluoroalkyl, radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group; $R_f''$ is $C_1-C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon polymeric composition having hydrophilic functional groups and R is hydrogen or a substituted or unsubstituted alkyl or aryl group.

In another aspect of this invention, the surface-modifying composition comprising a crosslinked fluorocarbon, such as perfluorocarbon, polymeric composition having hydrophilic functional groups of this invention is provided having connecting bridges or crosslinks joining polymeric chains, which can include loops joining portions of a polymeric chain, such as compositions having the formulae:

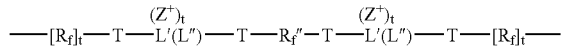     (9a)

wherein L' is $C^-$ or CH, L" is H or -$TR_f''$ and T, $Z^+$, t, $R_f$ and $R_f''$ are defined above, or

     (9b)

or

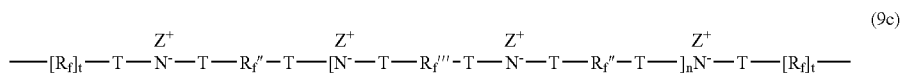     (9c)

covalently bonded through the $R_f$ groups, each to a CY group of a fluorocarbon polymeric composition of the formula:

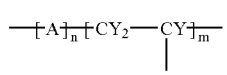     (2)

wherein A, Y, n, m, $R_f''$ and $R_f'''$ can be the same or different and can be a $C_1-C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon polymeric composition having hydrophilic functional groups; T, t, $R_f$ and R are defined above.

In another aspect of this invention, the surface-modifying composition comprising the crosslinked fluorocarbon polymeric composition having hydrophilic functional groups of formula (9c) such as a sulfonimide composition of the formula:

     (9d)

is prepared by reactng a fluorocarbon polymer precursor containing at least one pendant sulfonyl or carbonyl halide group having the formula:

     (3)

wherein $R_f$, T and X are defined above, with a reactant containing at least two substituted or unsubstituted amide or sulfonamide groups such as reactants having the formula:

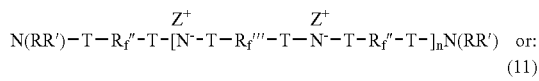

(10)

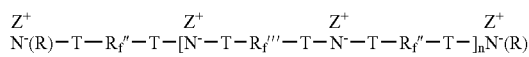

(11)

or mixtures thereof, wherein T, R, R' $R_f'$, $R_f''$, $R_f'''$, n and $Z^+$ are defined above.

Alternatively a fluorocarbon polymer precursor containing at least one pendant sulfonyl or carbonyl halide group of reactant (3) can be reacted with a fluorocarbon polymer precursor containing at least one pendant amide or sulfonamide group of reactant (6) or (7) defined above.

In another aspect of this invention, the surface-modifying composition comprising the crosslinked fluorocarbon polymeric composition having hydrophilic functional groups of this invention is prepared by reacting a fluorocarbon polymer precursor containing at least one pendant substituted or unsubstituted amide or sulfonamide group having the formula:

  (6)

wherein R, t, R' and $R_f'$ are defined above or an organic or inorganic salt of the amide or sulfonamide group having the formula:

  (7)

wherein $R_f$, T, R, $Z^+$ and t are defined above, with a reactant containing at least two sulfonyl or carbonyl halide groups such as compositions having the formula:

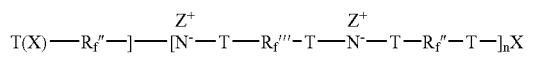  (12)

wherein T, $R_f''$ $R_f'''$, n, X and $Z^+$ are defined above. The fluorocarbon polymer precursor containing pendant amide or sulfonamide groups can be prepared by reacting the sulfonyl or carbonyl halide groups of a fluorocarbon polymer precursor having sulfonyl or carbonyl halide groups with anhydrous ammonia.

The surface-modifying composition comprising the branched fluorocarbon polymeric composition having hydrophilic functional groups of this invention is prepared by the modification of an existing fluorocarbon polymer precursor while avoiding the use of polymerizable unsaturated monomers that are difficult to control during polymerization. In addition, the surface-modifying composition comprising the crosslinked fluorocarbon polymeric compositions having hydrophilic functional groups of this invention are less swellable in solvents such as alcohols than are uncrosslinked polymers which renders them useful as fuel cell membranes having ionic properties with substantially reduced undesirable mass transfer through the membrane while retaining desirable ionic transfer through the membrane.

DESCRIPTION OF THE SPECIFIC EMBODIMENTS

Representative suitable fluorine-containing polymers useful for forming the substrates of this invention include polytetrafluoroethylene (PTFE), perfluoroalkoxy polymers (PFA), fluorinated ethylene-propylene copolymers (FEP), ethylene-tetrafluoroethylene copolymers (ETFE), polyvinylidene fluoride (PVDF), polychlorotrifluoroethylene (PCTFE), polyvinyl fluoride (PVF), ethylene-chlorotrifluoroethylene copolymer (ECTFE), or the like. Other suitable fluorine-containing polymers useful for forming the substrates of this invention include functionalized polymers such as fluorocarbon polymer precursors in their original form or any ionic form of the fluorocarbon polymer precursor, for example the sulfonic acid form, sulfonamide form, sulfonimide form, sulfonyl methide form, sulfonyl methane form, amide form, imide form or the like.

Exemplary fluorocarbon, preferably perfluorinated, polymer precursor from which the surface-modifying branched or crosslinked fluorocarbon polymeric compositions having hydrophilic functional groups are prepared comprise polymer compositions known generally as perfluorocarbon polymeric compositions such as those marketed by E. I. Dupont de Nemours and Company, Inc. under the name NAFION® or by Asahi Glass Company, Limited under the name FLEMION®.

The fluorocarbon polymer precursors useful in the present invention are defined by the formula:

  (13)

wherein A is a polymeric group derived from at least one fluorine-containing polymerizable monomer such as vinyl fluoride, hexafluoropropylene, vinylidene fluoride, trifluoroethylene, trifluorostyrene, chlorotrifluoroethylene, perfluoro (alkylvinyl ether), tetrafluoroethylene, cyclic monomers such as

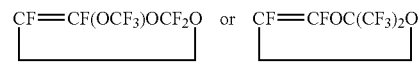

and mixtures thereof. Y is hydrogen or halogen wherein at least one Y is a fluorine and wherein it is preferred that all Ys are fluorine. B is a sulfonyl or carbonyl halide functional group or a group, which can be converted to a sulfonyl or carbonyl halide group such as sulfonic acid groups or salts thereof, amide or sulfonamide groups, carboxylic acid groups or salts thereof or the like; n and p are 0, 1 or an integer greater than 1; m is an integer of at least 1. $R_f$ is defined above.

Useful fluorocarbon polymer precursors can be polymers containing one or more monomers containing sulfonyl fluoride groups, which are set forth in U.S. Pat. Nos. 3,282,875; 3,041,317; 3,560,568; 3,718,627, which are incorporated herein by reference. Methods of preparation of perfluorocarbon polymeric compositions are set forth in U.S. Pat. Nos. 3,041,317; 2,393,967; 2,559,752 and 2,593,583, which are incorporated herein by reference. These perfluorocarbon polymeric compositions generally have pendant SO$_2$F based functional groups.

Examples of perfluorocarbon polymeric compositions containing sulfonyl-based functional groups are disclosed in U.S. Pat. No. 3,282,875, U.S. Pat. No. 3,560,568 and U.S. Pat. No. 3,718,627, which are incorporated herein by reference.

Illustrative of suitable sulfonyl fluoride containing monomers are

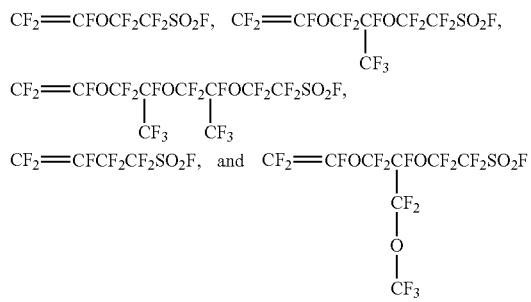

Other suitable fluorocarbon polymer precursors are polymers containing one or more monomers lacking sulfonyl or carbonyl halide functional groups, but which can be modified to include sulfonyl or carbonyl halide groups before or after forming the polymer. Suitable monomers of this type include trifluorostyrene, trifluorostyrenesulfonic acid or the like.

Fluorocarbon polymer precursors having pendant carbonyl-based functional groups can be prepared in any suitable conventional manner such as in accordance with U.S. Pat. No. 4,151,052 or Japanese patent application No. 52(1977) 38486 which are incorporated herein by reference or polymerized from a carbonyl functional group containing a monomer derived from a sulfonyl group containing monomer by a method such as is shown in U.S. Pat. No. 4,151,051 which is incorporated herein by reference. Illustrative examples of carbonyl-containing monomers include:

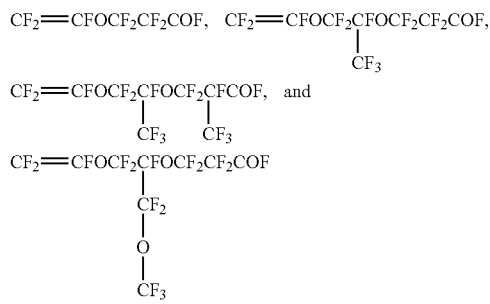

Preferred carbonyl containing monomers include:

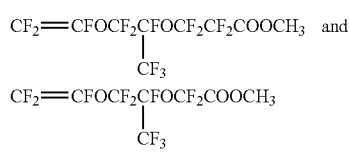

Particularly suitable fluorocarbon polymer precursors are copolymers of tetrafluoroethylene and a monomer having the formula:

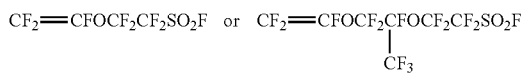

A sulfonic acid form of the fluorocarbon polymer precursor can be converted to the sulfonyl or carbonyl halide form of the fluorocarbon polymer precursor by a one step or two step process. In the one step process, the sulfonic acid form of the fluorocarbon polymer precursor can be reacted with PCl$_5$ and POCl$_3$ to produce the sulfonyl chloride form of the fluorocarbon polymer precursor such as described in U.S. Pat. No. 4,209,367 which is incorporated herein by reference. When the sulfonyl fluoride form is desired, the sulfonyl chloride form is reacted with KF to produce the sulfonyl fluoride form of the fluorocarbon polymer precursor in a second step. Both the sulfonyl chloride and the sulfonyl fluoride can be used in the process of this invention as described above.

The fluorocarbon polymer precursor used in the process of this invention to form the branched or the crosslinked fluorocarbon polymeric compositions having hydrophilic functional groups need not be restricted to a particular equivalent weight, instead, any polymer precursor having any equivalent weight may be used. Generally the equivalent weight of the fluorocarbon polymer precursor is between about 150 and about 2000, more usually between about 280 and about 1500. The equivalent weight of the fluorocarbon polymer precursor is the average molecular weight of the polymer of formula (13) divided by the total number of functional groups B present in the polymer.

In one aspect of this invention a surface comprising the branched fluorocarbon polymeric composition having hydrophilic functional groups is provided wherein at least one hydrophilic functional group is a sulfonyl or carbonyl-containing group of the formula:

and which is a branch or side group covalently bonded through the R$_f$ group to a CY group of a fluorocarbon polymeric composition of the formula:

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; R$_f$ is a C$_1$–C$_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $Z^+$ is a proton or an organic or an inorganic cation; t can be 0 or 1; L is C, CH or N; E is $R_f'T-$ or $R_f'-$; G is $R_f'T-$ or R; $R_f'$ is $C_1-C_{20}$ linear, cyclic or branched fluoroalkyl, preferably perfluoroalkyl, radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group and R is hydrogen or a substituted or unsubstituted alkyl or aryl group.

Representative branched fluorocarbon polymeric compositions having hydrophilic functional groups of formula (1) include:

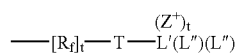
(1a)

wherein L' is $C^-$ or CH, L" is H or $-TR_f''$ and T, $Z^+$, t, and $R_f$ are defined above and $R_f''$ is a $C_1-C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group.

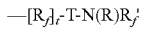
(1b)

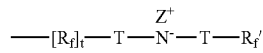
(1c)

wherein T, $R_f$, $R_f'$, R, $Z^+$ and t are defined above.

The compound of formula (1a) is formed by reacting a compound containing the functional group $(R_f'SO_2)_2C^{-2}(Z^{+2})$ or $(R_f'CO)_2C^{-2}(Z^{+2})$ with a fluorocarbon polymer precursor containing at least one pendant sulfonyl or carbonyl halide group or by reacting a compound of the formula $-[R_f]_tSO_2C^{-2}(Z^{+2})SO_2R_f'$ or $-[R_f]_tC(O)C^{-2}(Z^{+2})COR_f'$ with a compound of the formula $R_f'SO_2X$ or $R_f'COX$. The compounds of formulae $(R_f'SO_2)_2C^{-2}(Z^{+2})$, $(R_f'CO)_2C^{-2}(Z^{+2})$ and $-[R_f]_tSO_2C^{-2}(Z^{+2})SO_2R_f'$ or $-[R_f]_tC(O)C^{-2}(Z^{+2})COR_f'$ can be prepared by reacting the corresponding bis-sulfonyl methanes or carbonyl methanes with an alkylmagnesium halide by the method described in U.S. Pat. No. 2,732,398, which is incorporated herein by reference. Suitable compounds of the formula $(R_f'SO_2)_2C^{-2}(Z^{+2})$ include $(CF_3SO_2)[CF_3(CF_2)_3SO_2]C^{-2}$ $2MgCl-$, $(CF_3SO_2)_2C^{-2}$ $2MgCl-$, or the like. Suitable compounds of the formula $(R_f'CO)_2C^{-2}(Z^{+2})$ include $(CF_3CO)[CF_3(CF_2)_3CO]C^{-2}$ $2MgCl-$, $(CF_3CO)_2C^{-2}$ $2MgCl-$, or the like.

The compound of formula (1b) is formed by reacting a fluorocarbon polymer precursor containing at least one pendant sulfonyl or carbonyl halide group with a compound of the formula $R_f'NHR$ such as $CF_3(CF_2)_3NH_2$, $CF_3NH_2$, or the like.

In another aspect of this invention a surface comprising the branched fluorocarbon polymeric composition having hydrophilic functional groups is provided wherein at least one hydrophilic functional sulfonimide group of formula (1d):

(1d)

is a branch or side group covalently bonded through the $R_f$ group to a CY group of a fluorocarbon polymeric composition of the formula:

(2)

wherein A, Y, n, m, $R_f$, $R_f'$, t, and $Z^+$ are defined above.

Representative suitable $R_f$ groups include $-[OCF_2CF_2]-$, $-[OCF_2CF(CF_3)OCF_2CF_2]-$, $-[(CF_2)_4SO_2N^-(Na^+)SO_2(CF_2)_4]-$ or the like. Representative suitable $R_f'$ groups include $-CF_3$, $-C_2F_5$, $-C_2F_4H$, $-C_4F_9$, $-C_8F_{17}$, $-[OCF_2CF(CF_3)O(CF_2)_2SO_2N^-(H^+)SO_2CF_3]$, $-CF_2COF$, $-CF_2COOH$ or the like. Representative imide or sulfonimide-containing fluoropolymeric groups or organic or inorganic salts of the imide or sulfonimide groups can be formed from the compounds of formulae (10), (11) and (12). Representative suitable $Z^+$ groups include a proton, an alkali metal ion such as sodium, potassium, or the like, or an organic cation such as ammonium or triethylammonium groups, or the like.

In another aspect of this invention, the surface-modifying composition comprising the branched fluorocarbon polymeric composition having hydrophilic functional groups of this invention is prepared by reacting a fluorocarbon polymer precursor containing at least one pendant sulfonyl or carbonyl halide group having the formula:

(3)

wherein X is a halogen such as fluorine, chlorine, bromine or iodine and T, t and $R_f$ are defined above, with a substituted or unsubstituted amide or sulfonamide-containing reactant or mixtures thereof of the formula:

(4)

wherein R and R' are hydrogen or substituted or unsubstituted alkyl or aryl groups and T and $R_f'$ are defined above. Alternatively, an organic or inorganic salt of the amide or sulfonamide-containing reactant can be used, having the formula:

(5)

wherein R, $R_f'$, T and $Z^+$ are defined above or mixtures of reactants (4) and (5).

The reaction of the fluorocarbon polymer precursor with the substituted or unsubstituted amide or sulfonamide-containing reactant or salt thereof is believed to proceed via a condensation mechanism between the sulfonyl or carbonyl halide groups of the fluorocarbon polymer precursor and the amide or sulfonamide groups of the amide or sulfonamide-containing reactant thereby liberating a halide-containing byproduct. A non-nucleophilic base is typically used to scavenge and bind the halide-containing byproduct so that the reaction can proceed to the formation of the branched fluorocarbon polymeric composition having hydrophilic functional groups. The reaction is believed to proceed according to the following scheme 1, with reference to the substituted or unsubstituted amide or sulfonamide-containing reactant of formula (4):

Scheme 1

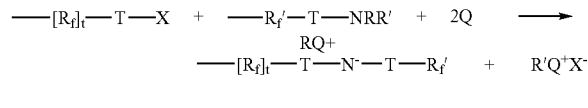

wherein Q is a non-nucleophilic base, $RQ^+$ and $R'Q^+$ are cations derived from the non-nucleophilic base and T, $R_f$, $R_f'$, X, R, R' and t are defined above.

Reaction of the fluorocarbon polymer precursor having sulfonyl or carbonyl halide groups with the substituted or unsubstituted amide or sulfonamide-containing reactant or salt thereof can be carried out with the fluorocarbon polymer precursor being in solid form, solvent-swollen form or in solution with the appropriate reactants in the solid, liquid or gas phase. When the fluorocarbon polymer precursor is in the solid form, the reaction is carried out under anhydrous conditions by contacting it with the substituted or unsubstituted amide or sulfonamide-containing reactant or salt thereof in a solvent that is non-reactive with the starting reactants. Representative suitable solvents include anhydrous polar aprotic solvents such as acetonitrile, tetrahydrofuran, dioxane, or the like, halogenated solvents such as chloroform, or the like. The reaction is carried out in the presence of an organic non-nucleophilic base in order to scavenge the halide-containing byproduct of the reaction. Representative suitable non-nucleophilic bases include alkylamines such as triethylamine, trimethylamine, or the like, pyridines, alkyl pyridines, alkyl piperidines, N-alkyl pyrrolidines, or the like. The reaction can be carried out in the absence of a solvent under conditions where there is enough mobility of the reactants to interact with each other such as when the non-nucleophilic base functions as a medium for the reaction. Other suitable halide-containing byproduct scavengers include KF, $Na_2CO_3$, Zn powder, CsF, or the like. Reaction is effected under anhydrous conditions such as under an inert atmosphere such as argon, nitrogen or the like in a vessel or a glove box at a temperature between about 0 and about 200° C., preferably between about 25 and about 125° C. Suitable reaction times are between about 5 minutes and about 72 hours, preferably between about 1 hour and about 24 hours. The reaction can be effected while mixing.

When the fluorocarbon polymer precursor is in solution, it is contacted with the substituted or unsubstituted amide or sulfonamide-containing reactant or salt thereof under the conditions set forth above. The product is recovered as a solid such as by precipitation or by removing the solvent. Representative suitable solvents for the fluorocarbon polymer precursor include halogenated solvents such as polychlorotrifluoroethylene, for example Halocarbon™ oil, perfluoroalkylamines, for example Fluorinert™ FC-70, or the like.

In another aspect of this invention, the surface-modifying composition comprising the branched fluorocarbon polymeric composition having hydrophilic functional groups of this invention is prepared by reacting a fluorocarbon polymer precursor containing at least one pendant substituted or unsubstituted amide or sulfonamide groups having the formula:

wherein t, R, T, R' and $R_f$ are defined above. Representative suitable R and R' include hydrogen, $CH_3$, $C_2H_5$, $C_2FH_4$, or the like. Alternatively, an organic or inorganic salt of the amide or sulfonamide group can be used, having the formula:

wherein T, t, R, $R_f$ and $Z^+$ are defined above, with a sulfonyl or carbonyl halide-containing reactant or mixtures thereof of the formula:

wherein T, $R_f'$ and X are defined above. The fluorocarbon polymer precursor containing pendant amide or sulfonamide groups can be prepared by reacting the sulfonyl or carbonyl halide groups of a fluorocarbon polymer precursor having sulfonyl or carbonyl halide groups with anhydrous ammonia. The anhydrous ammonia can be in the gas or liquid phase. This amidation reaction can be conducted at a temperature between about −78° C. and about 100° C. Suitable amidation reaction times are between about 1second and about 1 hour, preferably between about 5 seconds and about 15 minutes. The fluorocarbon polymeric composition having amide or sulfonamide groups is recovered in the ammonium salt form and can be further converted to the free amide or sulfonamide form by contact with acid. The reaction of the resulting amide or sulfonamide or salt thereof with the sulfonyl or carbonyl halide-containing reactant is carried out under the conditions set forth above and proceeds in an analogous manner as described in scheme 1.

In an alternative embodiment of this invention, the chain length of the $R_f'$ sulfonyl or carbonyl-containing fluoropolymeric group of formula (1c) can be controlled by one of two methods. In the first method, the fluorocarbon polymer precursor containing at least one pendant sulfonyl or carbonyl halide group of formula (3) is reacted with a difuncbonal fluoroalkylene amide or sulfonamide reagent of formulae (10) or (11) when n is 0 to result, in a terminal amide or sulfonamide group. The terminal amide or sulfonamide group then is reacted with a difunctional fluoroalkylene sulfonyl or carbonyl halide reagent of formula (12) when n is 0 to result in a terminal sulfonyl or carbonyl halide group. These reaction steps are repeated until the desired chain length of the $R_f'$ is attained. When the product contains a terminal sulfonyl or carbonyl halide group, this sulfonyl or carbonyl halide group can be hydrolyzed in a conventional manner. In the second method, the fluorocarbon polymer precursor containing at least one pendant amide or sulfonamide group of formulae (6) or (7) is reacted with a difunctional fluoroalkylene sulfonyl or carbonyl halide reagent of formula (12) when n is 0 to result in a terminal sulfonyl or carbonyl halide group. The terminal sulfonyl or carbonyl halide group then is reacted with a difunctional fluoroalkylene amide or sulfonamide reagent of formulae (10) or (11) when n is 0 to result in a terminal amide or sulfonamide group. These reaction steps are repeated until the desired chain length of the $R_f'$ group is attained. When the product contains a terminal sulfonyl or carbonyl halide group, this sulfonyl or carbonyl halide group can be hydrolyzed in a conventional manner.

The surface-modifying composition comprising the branched fluorocarbon polymeric composition having hydrophilic functional groups of this invention can be formed wherein the starting sulfonyl or carbonyl halide groups or the amide or sulfonamide groups of the fluorocarbon polymer precursor can be partially or completely converted to imide or sulfonimide groups in accordance with this invention. If desired, the remaining sulfonyl or carbonyl halide groups or amide or sulfonamide groups of the partially converted polymer can be converted to other functional groups such as sulfonic acid groups or salts thereof.

In another aspect of this invention, a surface-modifying composition comprising a crosslinked fluorocarbon, such as perfluorocarbon, polymeric composition having hydrophilic functional groups of this invention is provided having connecting bridges or crosslinks having sulfonyl or carbonyl-containing groups joining polymeric chains, which can include loops joining portions of a polymeric chain, such as compositions having the formula:

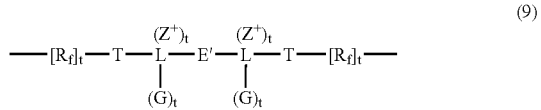

(9)

covalently bonded through the $R_f$ groups each to a CY group of a fluorocarbon polymeric composition of the formula;

(2)

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; $R_f$ is a $C_1$–$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $Z^+$ is a proton or an organic or an inorganic cation; t can be 0 or 1; L is C, CH or N; E' is -TR$_f'$T- or —R$_f'$—; G is R$_f'$T- or R; R$_f'$ and R$_f''$ can be the same or different and can be a $C_1$–$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonylcontaining fluoropolymeric group, optionally connected to another chain of the fluorocarbon polymeric composition having hydrophilic functional groups and R is hydrogen or a substituted or unsubstituted alkyl or aryl group.

Representative crosslinked fluorocarbon polymeric compositions having hydrophilic functional groups of formula (9) include:

(9a)

wherein L' is $C^-$ or CH, L" is H or -TR$_f''$ and T, $Z^+$, $R_f$, $R_f''$ and t are defined above, or —[R$_f$]$_t$-T-N(R)R$_f''$N(R)-T-[R$_f$]$_t$—  (9b)

or

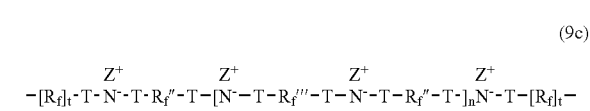

(9c)

wherein T, $R_f$, $R_f''$, R, n, t, and $Z^+$ are defined above and $R_f'''$ is a $C_1$–$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonylcontaining fluoropolymeric group, optionally connected to another chain of the fluorocarbon polymeric composition having hydrophilic functional groups.

The compound of formula (9a) is formed by reacting a fluorocarbon polymer precursor containing at least one pendant sulfonyl or carbonyl halide group with a compound containing the functional group $C^{-2}(SO_2R_f'')SO_2R_f''SO_2 C^{-2}(SO_2R_f'')$ $(2Z^{+2})$ or $C^{-2}(COR_f'')COR_f''C(O)C^{-2}(COR_f'')$ $(2Z^{+2})$ or by reacting a compound of the formula —[R$_f$]$_t$SO$_2$C$^{-2}$SO$_2$R$_f''$SO$_2$C$^{-2}$SO$_2$[R$_f$]$_t$— $(2Z^{+2})$ or —[R$_f$]$_t$C(O)C$^{-2}$COR$_f''$C(O)C$^{-2}$CO[R$_f$]$_t$— $(2Z^{+2})$ with a compound of the formula R$_f''$SO$_2$X or R$_f''$COX. The compounds of formulae $C^{-2}(SO_2R_f'')SO_2R_f''SO_2C^{-2}(SO_2R_f'')$ $(2Z^{+2})$ or $C^{-2}(COR_f'')COR_f''C(O)C^{-2}(COR_f'')$ $(2Z^{+2})$ and —[R$_f$]$_t$SO$_2$C$^{-2}$SO$_2$R$_f''$SO$_2$C$^{-2}$SO$_2$[R$_f$]$_t$— $(2Z^{+2})$ or —[R$_f$]$_t$C(O)C$^{-2}$COR$_f''$C(O)C$^{-2}$CO[R$_f$]$_t$— $(2Z^{+2})$ can be prepared by reacting the corresponding sulfonyl methanes with an alkylmagnesium halide by the method described in U.S. Pat. No. 2,732,398, which is incorporated herein by reference. Suitable compounds of the formula $C^{-2}(SO_2R_f'')SO_2R_f''SO_2C^{-2}(SO_2R_f'')$ $(2Z^{+2})$ include $CF_3SO_2C^{-2}SO_2(CF_2)_6SO_2C^{-2}SO_2CF_3$ 4MgCl—, $CF_3SO_2C^{-2}SO_2CF_2SO_2C^{-2}SO_2CF_3$ 4MgCl—, or the like. Suitable compounds of the formula $C^{-2}(COR_f'')COR_f''C(O)C^{-2}(COR_f'')$ $(2Z^{+2})$ include $CF_3C(O)C^{-2}CO(CF_2)_6C(O)C^{-2}C(O)CF_3$ 4MgCl—, $CF_3C(O)C^{-2}C(O)CF_2C(O)C^{-2}C(O)CF_3$ 4MgCl—, or the like.

The compound of formula (9b) is formed by reacting a fluorocarbon polymer precursor containing at least one pendant sulfonyl or carbonyl halide group with a compound of the formula N(R)HR$_f''$NH(R) such as $NH_2(CF_2)_6NH_2$, $NH_2CF_2NH_2$, or the like.

In another aspect of this invention, the surface-modifying composition comprising a crosslinked fluorocarbon polymeric composition having hydrophilic functional groups of this invention is provided having connecting bridges or crosslinks with at least two sulfonimide groups joining polymeric chains, which can include loops joining portions of a polymeric chain, such as compositions having the formula (9d):

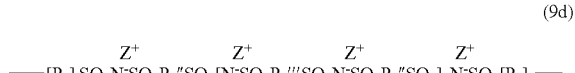

(9d)

covalently bonded through the $R_f$ groups, each to a CY group of a fluorocarbon polymeric composition of the formula:

(2)

wherein A, Y, m, $R_f$, $R_f''$, $R_f'''$, n, t, and $Z^+$ are defined above. Representative suitable $R_f'$ and $R_f'''$ include —$(CF_2)$—, —$(C_2F_3H)$—, —$[CF_2CF(CF_3)OCF_2CF_2]$—, —$(C_2F_4)$—, —$(C_4F_8)$—, —$[CF_2OCF_2CF(OCF_2SO_2F)CF_2]$—, —$(C_8F_{16})$—, or the like. Representative imide or sulfonimide-containing fluoropolymeric groups or organic or inorganic salts of the imide or sulfonimide groups can be formed from the compounds of formulae (10), (11) and (12).

In another aspect of this invention, the surface-modifying composition comprising a crosslinked fluorocarbon polymeric composition having hydrophilic functional groups of this invention is prepared by reacting a fluorocarbon polymer precursor containing at least one pendant sulfonyl or carbonyl halide group having the formula:

—$[R_f]_t$-T-X (3)

wherein T, t, X and $R_f'$ are defined above, with a reactant containing at least two substituted or unsubstituted amide or sulfonamide groups or mixtures thereof such as reactants having the formula:

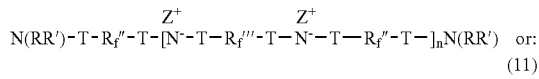

(10)

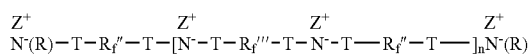

(11)

or mixtures thereof, wherein T, R, R', $R_f'$, $R_f'''$, n and $Z^+$ are defined above. Reagents (10) and (11) wherein n is 0 can be formed by first forming the difunctional fluoroalkylene sulfonyl or carbonyl halide precursor to reagents (10) and (11), when n is 0, by the process disclosed by Burton et al in Journal of Fluorine Chemistry Vol. 60 (1993), pp. 93–100, which is incorporated herein by reference. The difunctional fluoroalkylene sulfonyl or carbonyl halide can be converted to the difunctional fluoroalkylene amide or sulfonamide of reagents (10) and (11), when n is 0, by reaction thereof with anhydrous ammonia under the conditions set forth herein. When n is 1 or greater reagents (10) and (11) can be formed by reacting a difunctional fluoroalkylene sulfonyl or carbonyl halide with a difunctional fluoroalkylene amide or sulfonamide by the process of U.S. Pat. No. 5,874,616, which is incorporated herein by reference but with the difunctional fluoroalkylene amide or sulfonamide in excess so that the end groups comprise amide or sulfonamide groups.

Alternatively a fluorocarbon polymer precursor containing at least one pendant sulfonyl or carbonyl halide group of reactant (3) can be reacted with a fluorocarbon polymer precursor containing at least one pendant amide or sulfonamide group of reactant (6) or (7) defined above. The crosslinks of the crosslinked fluorocarbon polymeric composition having hydrophilic functional groups of this embodiment contain at least one imide or sulfonimide group.

The reaction of the fluorocarbon polymer precursor with the reactant containing at least two substituted or unsubstituted amide or sulfonamide groups or salts thereof is believed to proceed via a condensation mechanism between the sulfonyl or carbonyl halide groups of the fluorocarbon polymer precursor and the amide or sulfonamide groups of the reactant containing at least two amide or sulfonamide groups thereby liberating a halide-containing byproduct. A non-nucleophilic base is typically used to scavenge and bind the halide-containing byproduct so that the reaction can proceed to the formation of the crosslinked fluorocarbon polymeric composition having hydrophilic functional groups. The reaction is believed to proceed according to the following scheme 2, with reference to the reactant containing at least two substituted or unsubstituted amide or sulfonamide groups of formula (10):

Scheme 2

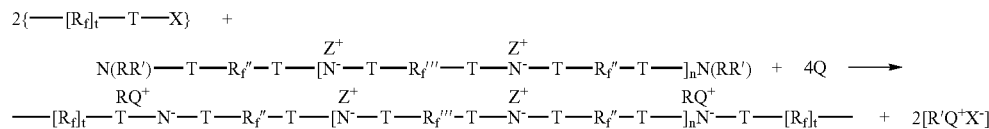

wherein Q is a non-nucleophilic base, $RQ^+$ and $R'Q^+$ are cations derived from the non-nucleophilic base and T, $R_f$, $R_f''$, $R_f'''$, X, R, R', $Z^+$, n and t are defined above.

Reaction of the fluorocarbon polymer precursor having sulfonyl or carbonyl halide groups with the reactant containing at least two substituted or unsubstituted amide or sulfonamide groups or salts thereof can be carried out with the fluorocarbon polymer precursor being in solid form, solvent-swollen form or in solution with the appropriate reactants in the solid, liquid or gas phase. When the fluorocarbon polymer precursor is in the solid form, the reaction is carried out under anhydrous conditions by contacting it with the reactant containing at least two substituted or unsubstituted amide or sulfonamide groups or salts thereof in a solvent that is non-reactive with the starting reactants. Representative suitable solvents include anhydrous polar aprotic solvents such as acetonitrile, tetrahydrofuran, dioxane, or the like, halogenated solvents such as chloroform, or the like. The reaction is carried out in the presence of an organic non-nucleophilic base in order to scavenge the halide-containing byproduct of the reaction, including alkylamines such as triethylamine, trimethylamine, or the like, pyridines, alkyl pyridines, alkyl piperidines, N-alkyl pyrrolidines, or the like. The reaction can be carried out in the absence of a solvent under conditions where there is enough mobility of the reactants to interact with each other such as when the non-nucleophilic base functions as a medium for the reaction. Other suitable halide-containing byproduct scavengers include KF, $Na_2CO_3$, Zn powder, CsF, or the like. Reaction is effected under anhydrous conditions such as under an inert atmosphere such as argon, nitrogen or the like in a vessel or a glove box at a temperature between about 0 and about 200° C., preferably between about 25 and about 125° C. Suitable reaction times are between about 5 minutes and about 72 hours, preferably between about 1 hour and about 24 hours. The reaction can be effected while mixing.

When the fluorocarbon polymer precursor is in solution, it is contacted with the reactant containing at least two substituted or unsubstituted amide or sulfonamide groups or salts thereof under the conditions set forth above. The crosslinked product is recovered. Representative suitable solvents for the fluorocarbon polymer precursor include halogenated solvents such as polychlorotrifluoroethylene such as Halocarbon™ oil, perfluoroalkylamines such as Fluorinert™ FC-70, or the like.

When the reaction between the fluorocarbon polymer precursor containing at least one pendant sulfonyl or carbonyl halide group of reactant (3) and the fluorocarbon polymer precursor containing at least one pendant amide or sulfonamide group of reactant (6) or (7) is effected, the reaction can be effected under the same conditions set forth above with reference to the reactant containing at least two substituted or unsubstituted amide or sulfonamide groups or salts thereof.

In another aspect of this invention, the surface-modifying composition comprising a crosslinked fluorocarbon polymeric composition having hydrophilic functional groups of this invention is prepared by reacting a fluorocarbon polymer precursor containing at least one pendant substituted or unsubstituted amide or sulfonamide group having the formula:

(6)

wherein T, R, t, R' and $R_f$ are defined above. Alternatively, an organic or inorganic salt of the amide or sulfonamide group can be used, having the formula:

(7)

wherein the groups of formulae (6) and (7) comprise a branch or side group covalently bonded through the $R_f$-group to a CY group of a fluorocarbon polymeric composition of the formula:

(2)

wherein A, Y, n, m, T, R, $R_f$, t and $Z^+$ are defined above, with a reactant containing at least two sulfonyl or carbonyl halide groups or mixtures thereof such as compositions having the formula:

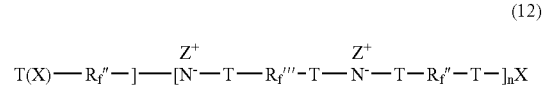

(12)

wherein T, $R_f''$, $R_f'''$, n, X and $Z^+$ are defined above. The fluoroalkylene sulfonyl or carbonyl halide reagent of formula (12), wherein n is 0 can be formed by the process disclosed by Burton et al in Journal of Fluorine Chemistry Vol. 60 (1993), pp. 93–100, which is incorporated herein by reference. When n is 1 or greater, reagent (12) can be formed by reacting a difunctional fluoroalkylene sulfonyl or carbonyl halide with a difunctional fluoroalkylene amide or sulfonamide by the process of U.S. Pat. No. 5,874,616, which is incorporated herein by reference but with the difunctional fluoroalkylene sulfonyl or carbonyl halide in excess so that the end groups comprise sulfonyl or carbonyl halide groups.

The fluorocarbon polymer precursor containing pendant amide or sulfonamide groups can be prepared by reacting the sulfonyl or carbonyl halide groups of a fluorocarbon polymer precursor having sulfonyl or carbonyl halide groups with anhydrous ammonia. The anhydrous ammonia can be in the gas or liquid phase. This amidation reaction can be conducted at a temperature between about –78° C. and about 100° C. Suitable amidation reaction times are between about 1second and about 1 hour, preferably between about 5 seconds and about 15 minutes. The fluorocarbon polymer precursor containing pendant amide or sulfonamide groups is recovered in the ammonium salt form and can be further converted to the free amide or sulfonamide form by contact with acid. The reaction of the resulting fluorocarbon polymer precursor containing at least one pendant substituted or unsubstituted amide or sulfonamide group or salts thereof with the reactant containing at least two sulfonyl or carbonyl halide groups represented in formula (12) is carried out under the conditions set forth above and proceeds in an analogous manner as described in scheme 2.

In an alternative embodiment of this invention, the chain length represented by n of formula (9c) can be controlled by first forming a starting polymer containing terminal sulfonyl or carbonyl halide groups and a polymer containing terminal amide or sulfonamide groups, which are then reacted with each other to form the crosslinks having the desired n. The starting polymer containing terminal sulfonyl or carbonyl halide groups can be the fluorocarbon polymer precursor containing at least one pendant sulfonyl or carbonyl halide group of formula (13) or can be formed by reacting a fluorocarbon polymer precursor containing at least one pendant sulfonyl or carbonyl halide group of formula (13) with a difunctional fluoroalkylene amide or sulfonamide reagent of formulae (10) or (11) when n is 0 to result in a terminal amide or sulfonamide group. The terminal amide or sulfonamide group then is reacted with a difunctional fluoroalkylene sulfonyl or carbonyl halide reagent of formula (12) when n is 0 to result in a terminal sulfonyl or carbonyl halide group. These reaction steps are repeated until a desired first portion of the chain length, defined by n, is attained and the final reaction is with the difunctional fluoroalkylene sulfonyl or carbonyl halide reagent of formula (12) when n is 0 to result in a terminal sulfonyl or carbonyl halide group. The polymer containing terminal amide or sulfonamide groups can be the fluorocarbon polymer precursor containing at least one pendant amide or sulfonamide group of formulae (6) or (7) or can be formed in the same manner set forth above for the starting polymer containing terminal sulfonyl or carbonyl halide groups until a desired second portion of the chain length, defined by n, is attained and the final reaction is with the difunctional fluoroalkylene amide or sulfonamide reagent of formulae (10) or (11) when n is 0 to result in a terminal amide or sulfonamide group. The starting polymer containing terminal sulfonyl or carbonyl halide groups also can be formed by reacting a fluorocarbon polymer precursor containing at least one pendant amide or sulfonamide group of formulae (6) or (7) with a difunctional fluoroalkylene sulfonyl or carbonyl halide reagent of formula (12) when n is 0 to result in a terminal sulfonyl or carbonyl halide group.

The surface-modifying composition comprising a crosslinked fluorocarbon polymeric composition having hydrophilic functional groups of this invention can be formed wherein the starting sulfonyl or carbonyl halide groups or the amide or sulfonamide groups of the fluorinated polymer precursor can be partially or completely converted to the crosslinking bridges in accordance with this invention. If desired, the remaining sulfonyl or carbonyl halide groups or amide or sulfonamide groups of the partially converted polymer can be converted to other functional groups such as imide or sulfonimide groups or sulfonic acid groups or salts thereof.

The surface-modifying compositions of this invention can be formed on the surface of the substrate by first applying the fluorinated polymer precursor to the surface of a previously formed substrate by any conventional means known in the art such as by coating the substrate with a solution of the fluorinated polymer precursor in an appropriate solvent followed by removal of the solvent, by extruding the fluorinated polymer precursor in the melt directly onto the surface of the substrate followed by cooling to solidify the fluorinated polymer precursor, by forming the fluorinated polymer precursor from its monomeric components directly on the surface of the substrate or the like. Alternatively, the fluorinated polymer precursor can be included or blended in with the fluorine-containing polymer at the time of the formation of the substrate such as by coextrusion of the fluorinated polymer precursor and fluorine-containing polymer to form the substrate or by extruding a blend of the fluorinated polymer precursor and the fluorine-containing polymer to form the substrate or by sintering a mixture of the fluorinated polymer precursor and fluorine-containing polymer followed by stretching, if necessary, to form the substrate. The modified surface can be completely or partially modified. Partial modification can be achieved such as by utilizing a mask during the application of the fluorinated polymer precursor or by applying the fluorinated polymer precursor on selective areas of the substrate. The degree of porosity of the modified porous substrate can be controlled by controlling the amount of fluorinated polymer precursor applied to the unmodified substrate. Thus the substrate can be rendered non-porous or can have essentially the same porous structure as the unmodified substrate. Optionally, a heat treatment step can be implemented after the fluorinated polymer precursor is applied to the substrate in order to improve uniformity of the modified surface.

EXAMPLE 1

This example details the process for converting a commercially available non-porous perfluoroionomer film made from a fluorocarbon polymer precursor having sulfonyl fluoride groups to the sulfonamide form.

A piece of commercially available Nafion® NE-105F film made from a perfluoroionomer in the sulfonyl fluoride form having an equivalent weight of 980 was placed in a small stainless steel pressure vessel. The vessel was evacuated to a pressure no greater than 100 mTorr for at least 5 minutes. Gaseous anhydrous ammonia was then introduced into the vessel until the pressure in the vessel reached 60 psi. The film remained in contact with anhydrous ammonia for 30 hours at 60° C. The vessel was allowed to equilibrate to room temperature, vented and purged with argon for five minutes. The film was removed from the vessel, rinsed in water and exposed to nitric acid to convert the film into the free sulfonamide form. The film was further rinsed with water and dried at room temperature.

The film appears stronger and stiffer than the starting film. Attenuated total reflectance Infrared (IR) spectra of the film reveal the presence of sulfonamide groups. No significant amounts of sulfonyl fluoride groups remain on the film indicating complete conversion to the sulfonamide form.

EXAMPLE 2

This example details the process for converting the film in the sulfonamide form from example 1 to the branched perfluorobutane sulfonimide form.

Working under strictly anaerobic and anhydrous conditions in a glove box under argon, the dry film in the sulfonamide form from example 1 was immersed in a solution containing 0.5 ml perfluorobutanesulfonyl fluoride and 5 ml anhydrous triethylamine in a small pressure vessel. The vessel was closed and charged with argon to 60 psi. The vessel was closed and placed in an oven at 100° C. for 63 hours. The vessel was removed from the oven and allowed to equilibrate to room temperature. The pressure was released from the vessel and the vessel was opened under ambient conditions. The film was removed from the vessel and rinsed with three tetrahydrofuran rinses, followed by three water rinses and finally contacted with nitric acid to convert the film into the free acid form. The film was further rinsed with water and dried at room temperature.

The film appears to have softer mechanical properties than the film in the sulfonamide form. The film was equilibrated in boiling ethanol and the degree of swelling was measured to be 64%. Attenuated total reflectance IR spectra of the film reveal the presence of sulfonimide groups. No significant amounts of sulfonamide groups remain on the membrane indicating complete conversion to the sulfonimide form.

EXAMPLE 3

This example details the process for crosslinking the film in the sulfonamide form from example 1 using sulfonimide linkages.

Working under strictly anaerobic and anhydrous conditions in a glove box under argon, the dry film in the sulfonamide form from example 1 was immersed in a solution containing 0.5 ml of perfluorobutane-1,4-bis-sulfonyl fluoride and 5 ml anhydrous triethylamine in a small pressure vessel. The vessel was closed and charged with argon to 60 psi. The vessel was closed and placed in an oven at 100° C. for 63 hours. The vessel was removed from the oven and allowed to equilibrate to room temperature. The pressure was released from the vessel and the vessel was opened under ambient conditions. The film was removed from the vessel and rinsed with three tetrahydrofuran rinses, followed by three water rinses and finally contacted with nitric acid to convert the film into the free acid form. The film was further rinsed with water and dried at room temperature.

The film appears stronger and stiffer than the film in the sulfonamide form. The film was equilibrated in boiling ethanol and the degree of swelling was measured to be 30%. Attenuated total reflectance IR spectra of the film reveal the presence of sulfonimide groups. No significant amounts of sulfonamide groups remain on the membrane indicating crosslinking of the film using sulfonimide linkages.

EXAMPLE 4

This example details the process for coating the surfaces of a porous PTFE membrane with a fluorinated polymer precursor in the sulfonyl fluoride form.

A 2% by weight solution of a copolymer of tetrafluoroethylene and perfluorovinyloxyethanesulfonyl fluoride, having an equivalent weight of 500, was prepared by dissolving the polymer in a one to one mixture of Fluorinert™ FC-75, obtained from the 3M company and Halocarbon™ oil (0.8 series), obtained from the Halocarbon Products Corporation. A 47 mm disk sample of a PTFE porous membrane, having a nominal pore size of 1.0 micron, was restrained in an annular metal frame. The exposed area of the membrane was coated with the copolymer by applying a total of 15 small drops of the above copolymer solution to each side of the membrane in a uniform fashion followed by evaporation of the solvents at room temperature. The resulting coated membrane was then heated in an oven at 250° C. for 5 minutes. A transmission IR spectrum of the coated membrane shows the presence of the $SO_2F$ groups.

EXAMPLE 5

This example details the process for converting the coated membrane from example 4 to the sulfonamide form of the fluorinated polymer precursor.

The coated membrane form example 4 was placed in a small stainless steel pressure vessel. The vessel was evacuated to a pressure no greater than 100 mTorr for at least 5 minutes. Gaseous anhydrous ammonia was then introduced into the vessel until the pressure in the vessel reached 60 psi. The membrane remained in contact with anhydrous ammonia for 2 hours at room temperature. The vessel was vented and purged with argon for five minutes. The membrane was removed from the vessel inside a glove box under argon to keep dry.

Transmission IR spectra of the membrane reveal the presence of sulfonamide groups. No significant amounts of sulfonyl fluoride groups remain on the membrane indicating complete conversion to the sulfonamide form.

EXAMPLE 6

This example details the process for converting the coated membrane from example 5 to a porous membrane having its surfaces modified with the branched trifluoromethane sulfonimide form of the fluorinated polymer precursor.

Working under stricty anaerobic and anhydrous conditions in a glove box under argon, the dry membrane, in the sulfonamide form, from example 5 was immersed in a solution containing 1 ml anhydrous triethylamine and 6 ml anhydrous n-hexane in a small pressure vessel. The vessel was closed and charged with gaseous trifluoromethanesulfonyl fluoride to a pressure of 60 psi. The vessel was closed and placed in an oven at 100° C. for 16 hours. The vessel was removed from the oven and allowed to equilibrate to room temperature. The pressure was released from the vessel and the vessel was opened under ambient conditions. The membrane was removed from the vessel and rinsed with tetrahydrofuran followed by acetonitrile and finally water. The membrane was then contacted with nitric acid to convert the sulfonimide groups into the free acid form. The membrane was further rinsed with water and dried at room temperature.

Transmission IR spectra of the membrane reveal the presence of sulfonimide groups. No significant amounts of sulfonamide groups remain on the membrane indicating complete conversion to the sulfonimide form. The membrane remained opaque and had improved hydrophilic properties as measured by its complete wetting with a liquid having a surface tension of about 46 dynes/cm containing 25% methanol in water. In contrast, an unmodified membrane control did not wet with a liquid having a surface tension of about 25 dynes/cm containing 90% methanol in water although it was observed to wet with pure methanol having a surface tension of about 23 dynes/cm. The modified porous membrane had a water permeability of 0.96 ml/second per $cm^2$ of frontal surface area of membrane under a vacuum differential of 27.5" Hg.

EXAMPLE 7

This example details the process for converting a porous PTFE membrane into a non-porous membrane modified with the branched perfluorobutane sulfonimide form of a fluorinated polymer precursor.

A 47 mm disk sample of a PTFE porous membrane, having a nominal pore size of 0.1 micron was coated with a copolymer of tetrafluoroethylene and perfluorovinyloxyethanesulfonyl fluoride, having an equivalent weight of 500, according to the process of example 4 except using a solution containing 6% by weight of the copolymer. The sulfonyl fluoride groups on the membrane sample were then converted completely to sulfonamide groups according to the process of example 5.

Working under strictly anaerobic and anhydrous conditions in a glove box under argon, the dry membrane, in the sulfonamide form, was immersed in a solution containing 1 ml perfluorobutanesulfonyl fluoride and 3 ml anhydrous triethylamine in a small pressure vessel. The vessel was closed and charged with argon to a pressure of 40 psi. The vessel was closed and placed in an oven at 100° C. for 16 hours. The vessel was removed from the oven and allowed to equilibrate to room temperature. The pressure was released from the vessel and the vessel was opened under ambient conditions. The membrane was removed from the vessel and rinsed with tetrahydrofuran followed by water. The membrane was then contacted with hydrochloric acid to convert the sulfonimide groups into the free acid form. The membrane was further rinsed with water and dried at room temperature.

Transmission IR spectra of the membrane reveal the presence of sulfonimide groups. No significant amounts of sulfonamide or sulfonyl fluoride groups remain on the membrane indicating complete conversion to the sulfonimide form. The membrane became translucent and had improved hydrophilic properties as measured by its complete wetting with water. The membrane did not have any measurable water permeability under a vacuum differential of 27.5" Hg.

EXAMPLE 8

This example details the process for modifying a porous PTFE membrane with a crosslinked perfluorocarbon polymeric composition having perfluorinated crosslinks containing sulfonimide groups.

A 47 mm disk sample of a PTFE porous membrane, having a nominal pore size of 0.1 micron, was coated with a copolymer of tetrafluoroethylene and perfluorovinyloxy-ethanesulfonyl fluoride, having an equivalent weight of 500. The coating was effected by applying an excess of a 5% solution of the copolymer, in a one to one mixture of Fluorinert™ FC-75 obtained from the 3M company and Halocarbon™ oil (0.8 series) obtained from the Halocarbon Products Corporation, uniformly to the membrane to ensure complete wetting. The membrane was then squeezed gently between smooth rollers to remove any excess solution from its surface. The membrane was then allowed to dry at room temperature and finally heated in an oven at 250° C. for 5 minutes. Transmission IR spectra of the membrane confirmed the presence of sulfonyl fluoride groups. Subsequently, the sulfonyl fluoride groups on the membrane sample were converted completely to sulfonamide groups according to the process of example 5.

Working under strictly anaerobic and anhydrous conditions in a glove box under argon, the dry membrane, in the sulfonamide form, was immersed in a solution containing 15 small drops of perfluorobutane-1,4-bis-sulfonyl fluoride, 1 ml anhydrous triethylamine and 4 ml anhydrous n-hexane in a small pressure vessel. The vessel was closed and placed in an oven at 100° C. for 14 hours. The vessel was removed from the oven and allowed to equilibrate to room temperature before opening under ambient conditions. The membrane was removed from the vessel and rinsed with tetrahydrofuran followed by acetonitrile and finally water. The membrane was then contacted with nitric acid to convert the sulfonimide groups into the free acid form. The membrane was further rinsed with water and dried at room temperature.

Transmission IR spectra of the membrane reveal the presence of sulfonimide groups. No significant amounts of sulfonamide or sulfonyl fluoride groups remain on the membrane indicating that the perfluorocarbon polymeric composition on the surface of the membrane has been crosslinked with perfluorinated crosslinks via sulfonimide linkages. The membrane remained opaque and had improved hydrophilic properties as measured by its complete wetting with water. The modified porous membrane had an air permeability of 1.0 standard cm$^3$ per psi of back pressure per mm$^2$ of membrane frontal surface area.

EXAMPLE 9

This example details the process for converting a porous PTFE membrane into a non-porous membrane modified with a crosslinked perfluorocarbon polymeric composition having perfluorinated crosslinks containing sulfonimide groups.

A 47 mm disk sample of a PTFE porous membrane, having a nominal pore size of 0.1 micron was coated with a copolymer of tetrafluoroethylene and perfluorovinyloxy-ethanesulfonyl fluoride, having an equivalent weight of 500, according to the process of example 4 except using a solution containing 8% by weight of the copolymer. The sulfonyl fluoride groups on the membrane sample were then converted completely to sulfonamide groups according to the process of example 5.

Working under strictly anaerobic and anhydrous conditions in a glove box under argon, the dry membrane, in the sulfonamide form, was immersed in a solution containing 10 small drops of perfluorobutane-1,4-bis-sulfonyl fluoride and 3 ml anhydrous triethylamine in a small pressure vessel. The vessel was closed and charged with argon to a pressure of 60 psi. The vessel was closed and placed in an oven at 100° C. for 15 hours. The vessel was removed from the oven and allowed to equilibrate to room temperature. The pressure was released from the vessel and the vessel was opened under ambient conditions. The membrane was removed from the vessel and rinsed with tetrahydrofuran followed by water. The membrane was then contacted with nitric acid to convert the sulfonimide groups into the free acid form. The membrane was further rinsed with water and dried at room temperature.

Transmission IR spectra of the membrane reveal the presence of sulfonimide groups. No significant amounts of sulfonamide or sulfonyl fluoride groups remain on the membrane indicating that the perfluorocarbon polymeric composition present in the membrane has been crosslinked with perfluorinated crosslinks via sulfonimide linkages. The membrane became translucent and had improved hydrophilic properties as measured by its complete wetting with water. The membrane did not have any measurable water permeability under a vacuum differential of 27.5" Hg.

EXAMPLE 10

This example details the process for modifying the surface of a non-porous fluorinated ethylene-propylene copolymer (FEP) film with a crosslinked perfluorocarbon polymeric composition having perfluorinated crosslinks containing sulfonimide groups.

The surfaces of a 47 mm disk sample of a FEP non-porous film, having a thickness of 5 mils, were coated with a copolymer of tetrafluoroethylene and perfluorovinyloxy-ethanesulfonyl fluoride, having an equivalent weight of 500. The coating was applied according to the process of example 4 except using a solution containing 5% by weight of the copolymer. Subsequently, the sulfonyl fluoride groups on the surface of the film were converted completely to sulfonamide groups according to the process of example 5.

Working under strictly anaerobic and anhydrous conditions in a glove box under argon, the dry film, in the sulfonamide form, was immersed in a solution containing 20 small drops of perfluorobutane-1,4-bis-sulfonyl fluoride, 0.5 ml anhydrous triethytamine and 6 ml anhydrous n-hexane in a small pressure vessel. The vessel was closed and placed in an oven at 100° C. for 16 hours. The vessel was removed from the oven and allowed to equilibrate to room temperature before opening under ambient conditions. The film was removed from the vessel and rinsed with tetrahydrofuran followed by acetonitrile and finally water. The film was then contacted with nitric acid to convert the sulfonimide groups into the free acid form. The film was further rinsed with water and dried at room temperature.

Attenuated total reflectance IR spectra of the film's surface reveal the presence of sulfonimide groups. No significant amounts of sulfonamide or sulfonyl fluoride groups remain on the film indicating that the perfluorocarbon polymeric composition on the surface of the film has been crosslinked with perfluorinated crosslinks via sulfonimide linkages. The film became slightly opaque and had improved hydrophilic properties as measured by its complete wetting with water whereby a continuous thin film of water covered the treated surface of the film when exposed to water even after shaking the film to remove any excess water. In contrast, when an untreated FEP film control is exposed to water, the water beads up into droplets which are easily removed from the surface of the film upon shaking thus leaving a dry film surface with no water present. The surface modified non-porous film did not show any significant permeability to water.

What is claimed is:

1. An article having a hydrophilic surface formed from a substrate comprising a fluorine-containing polymer having the surface of the substrate contacted with and modified with a crosslinked fluorocarbon polymeric composition which is crosslinked with fluorinated crosslinking groups and which has hydrophilic functional groups, said crosslinked fluorocarbon polymeric composition being derived from an uncrosslinked fluorocarbon polymeric composition containing a functional group selected from the group consisting of a sulfonyl halide, a carbonyl halide, a group that can be converted to a sulfonyl halide and a group that can be converted to a carbonylhalide; wherein the crosslinked fluorocarbon polymeric composition having hydrophilic functional groups has the formula:

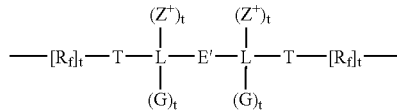

covalently bonded through the $R_f$ groups each to a CY group of a fluorocarbon polymeric composition of the formula:

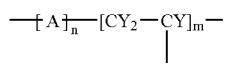

wherein A is a polymeric group derived from at least one fluorine-containing polymerizable monomer, n is an integer that can be 0, 1 or greater than 1, m is an integer of at least 1 and Y is hydrogen or halogen wherein at least one Y is a fluorine; T is a carbonyl or sulfonyl group; $R_f$ is a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; Z+ is a proton or an organic or an inorganic cation; t can be 0 or 1; L is C, CH or N; E' is -T$R_f''$T- or —$R_f'$—; G is $R_f'$T- or R; $R_f'$ is $C_1$–$C_{20}$ linear, cyclic or branched fluoroalkyl radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group; $R_f''$ is $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain or the fluorocarbon polymeric composition having hydrophilic functional groups and R is hydrogen or a substituted or unsubstituted alkyl or aryl group.

2. An article having a hydrophilic surface formed from a substrate comprising a fluorine-containing polymer having the surface of the substrate contacted with and modified with a crosslinked fluorocarbon polymeric composition which is crosslinked with fluorinated crosslinking groups and which has hydrophilic functional groups, said crosslinked fluorocarbon polymeric composition being derived from an uncrosslinked fluorocarbon polymeric composition containing a functional group selected from the group consisting of a sulfonyl halide, a carbonyl halide, a group that can be converted to a sulfonyl halide and a group that can be converted to a carbonylhalide; wherein the crosslinked fluorocarbon polymeric composition having hydrophilic functional groups has the formula:

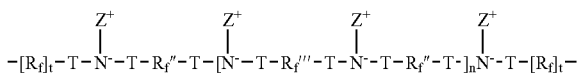

covalently bonded through the $R_f$ groups, each to a CY group of a fluorocarbon polymeric composition of the formula:

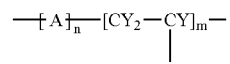

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; $R_f$ is a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; $R_f''$ and $R_f'''$ can be the same or different and can be a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon polymeric composition having hydrophilic functional groups; Z+ is a proton or an organic or an inorganic cation; and t can be 0 to 1.

3. The article of any one of claims 1 or 2 wherein A is selected from the group consisting of vinyl fluoride, hexafluoropropylene, vinylidene fluoride, trifluoroethylene, chlorotrifluoroethylene, perfluoro(alkylvinyl ether, and tetrafluoroethylene.

4. The article of claim 3 wherein the substrate is porous and the article is porous.

5. The article claim 3 wherein the substrate is porous and the article is non-porous.

6. The article of claim 3 wherein the substrate is non-porous and the article is non-porous.

7. An article having a hydrophilic surface formed from a substrate comprising a fluorine-containing polymer having the surface of the substrate contacted with and modified with a crosslinked fluorocarbon polymeric composition which is crosslinked with fluorinated crosslinking groups and which has hydrophilic functional groups, said crosslinked fluorocarbon polymeric composition being derived from an uncrosslinked fluorocarbon polymeric composition containing a functional group selected from the group consisting of a sulfonyl halide, a carbonyl halide, a group that can be converted to a sulfonyl halide and a group that can be converted to a carbonylhalide; wherein the crosslinked fluorocarbon polymeric composition having hydrophilic functional groups has the formula:

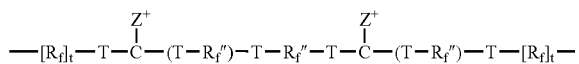

covalently bonded through the $R_f$ groups each to a CY group of a fluorocarbon polymeric composition of the formula:

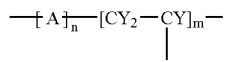

wherein A is a polymeric group derived from at least one fluorine-containing polymerizable monomer, n is an integer that can be 0, 1 or greater than 1; m is an integer of at least 1 and Y is a hydrogen or halogen wherein at least one Y is a fluorine; T is a carbonyl or sulfonyl group; $R_f$ is a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; $Z^+$ is a proton or an organic or an inorganic cation; t can be 0 or 1; $R_f''$ is $C_1$–$C_{20}$ linear, cyclic or branched fluoroalkyl radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon composition having hydrophilic functional groups.

8. The article of claim 7 wherein A is selected from the group consisting of vinyl fluoride, hexafluoropropylene, vinylidene fluoride, trifluoroethylene, chlorotrifuoroethylene, perfluoro(alkylvinyl ether), and tetrafluoromethylene.

9. The article of any one of claims 7 or 8 wherein the substrate is porous and the article is porous.

10. The article of any one of claims 7 or 8 wherein the substrate is porous and the article is non-porous.

11. The article of any one of claims 7 or 8 wherein the substrate is non-porous and the article is non-porous.

12. An article having a hydrophilic surface formed from a substrate comprising a fluorine-containing polymer having the surface of the substrate contacted with and modified with a crosslinked fluorocarbon polymeric composition which is crosslinked with fluorinated crosslinking groups and which has hydrophilic functional groups, said crosslinked fluorocarbon polymeric composition being derived from an uncrosslinked fluorocarbon polymeric composition containing a functional group selected from the group consisting of a sulfonyl halide, a carbonyl halide, a group that can be converted to a sulfonyl halide and a group that can be converted to a carbonylhalide; wherein the crosslinked fluorocarbon polymeric composition having hydrophilic functional groups has the formula:

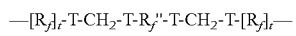

which is covalently bonded through the $R_f$ groups, each to a CY group of a fluorocarbon polymeric composition of the formula:

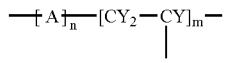

wherein A is a polymeric group derived from at least one fluorine-containing polymerizable monomer, n is an integer that can be 0, 1 or greater than 1, m is an integer of at least 1 and Y is hydrogen or halogen wherein at least one Y is a fluorine; T is a carbonyl or sulfonyl group; $R_f$ is a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; t can be 0 or 1; and $R_f''$ is $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group; optionally connected to another chain of the fluorocarbon polymeric composition having hydrophilic functional groups.

13. The article of claim 12 wherein A is selected from the group consisting of vinyl fluoride, hexafluoropropylene, vinylidene fluoride, trifluoroethylene, chlorotrifluorethylene, perfluoro(alkylvinyl ether), and tetrafluoroethylene.

14. An article having a hydrophilic surface formed of a substrate comprising a fluorine containing a polymer having its surface contacted with and modified with a crosslinked fluorocarbon polymeric composition having hydrophilic functional groups of the formula:

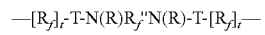

which is covalently bonded through the $R_f$ groups, each to a CY group of a fluorocarbon polymeric composition of the formula:

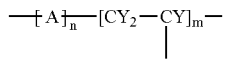

wherein A is a polymeric group derived from at least one fluorine-containing polymerizable monomer, n is an integer that can be 0, 1 or greater than 1, m is an integer of at least 1 and Y is hydrogen or halogen wherein at least one Y is a fluorine; T is a carbonyl or sulfonyl group; $R_f$ is a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; t can be 0 or 1, and R is hydrogen or a sustituted or unsustituted alkyl or aryl group, and $R_f''$ is $C_1$–$C_{20}$ linear, cyclic or branched fluoroalkyl radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group; optionally connected to another chain of the fluorocarbon polymeric composition having hydrophilic functional groups selected from the group consisting of a sulfonyl halide, a carbonyl halide, a group that can be converted to a sulfonyl halide and a group that can be converted to a carbonyl halide.

15. The article of claim 14 wherein A is selected from the group consisting of vinyl fluoride, hexafluoropropylene, vinylidene fluoride, trifluoroethylene, chlorotrifluoroethylene, perfluoro(alkylvinyl ether), and tetrafluoroethylene.

16. The article of any one of claims 12, 13, 14 or 15 wherein the substrate is porous and the article is porous.

17. The article of any one of claims 12, 13, 14 or 15 wherein the substrate is porous and the article is non-porous.

18. The article of any one of claims 12, 13, 14 or 15 wherein the substrate is non-porous and the article is non-porous.

19. An article having a hydrophilic surface formed from a substrate comprising a fluorine-containing polymer having its surface contacted with and modified with a branched fluorocarbon polymer having a branch chain of the formula selected from the group consisting of:

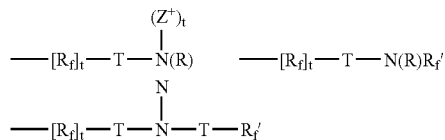

which is covalently bonded through the $R_f$ groups, each to a CY group of a fluorocarbon polymeric composition of the formula:
wherein A is a polymeric group derived from at least one fluorine-containing polymerizable monomer, n is an integer that can be 0, 1 or greater than 1, m is an integer of at least 1 and Y is hydrogen or halogen wherein at least one Y is a fluorine; T is a carbonyl or sulfonyl group; $R_f$ is a $C_1-C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; Z+ is a proton or an organic or an inorganic cation, and R is hydrogen or a sustituted or unsubstituted alkyl or aryl group; t can be 0 or 1 and $R_f'$ is $C_1-C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain or the fluorocarbon polymeric composition having hydrophilic functional groups, said branched fluorocarbon polymeric composition being derived from an uncrosslinked fluorocarbon polymeric composition containing a functional group selected from the group consisting of a sulfonyl halide, a carbanyl halide, a group that can be converted to a sulfonyl halide and a group that can be converted to a carbonyl halide.

20. An article having a hydrophilic surface formed from a substrate comprising a fluorine-containing polymer having a portion of its surface contacted with and modified with a crosslinked fluorocarbon polymeric composition which is crosslinked with fluorinated crosslinking groups and which has hydrophilic functional groups, said crosslinked fluorocarbon polymeric composition being derived from an uncrosslinked fluorocarbon polymeric composition containing a functional group selected from the group consisting of a sulfonyl halide, a carbonyl halide, a group that can be converted to a sulfonyl halide and a group that can be converted to a carbonyl halide; wherein the crosslinked fluorocarbon polymeric composition having hydrophilic functional groups has the formula:

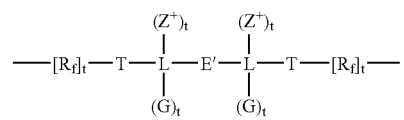

covalently bonded through the $R_f$ groups each to a CY group of a fluorocarbon polymeric composition of the formula:

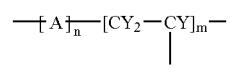

wherein A is a polymeric group derived from at least one fluorine-containing polymerizable monomer, n is an integer that can be 0, 1 or greater than 1, m is an integer of at least 1 and Y is hydrogen or halogen wherein at least one Y is a fluorine; T is a carbonyl or sulfonyl group; $R_f$ is a $C_1-C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; $Z^+$ is a proton or an organic or an inorganic cation; t can be 0 or 1; L is C, CH or N; E' is -TR$_f$"T- or —R$_f'$—; G is R$_f'$T- or R; R$_f'$ is $C_1-C_{20}$ linear, cyclic or branched fluoroalkyl radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group; R$_f$" is $C_1-C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain or the fluorocarbon polymeric composition having hydrophilic functional groups and R is hydrogen or a substituted or unsubstituted alkyl or aryl group.

21. An article having a hydrophilic surface formed from a substrate comprising a fluorine-containing polymer having a portion of its surface contacted with and modified with a crosslinked fluorocarbon polymeric composition which is crosslinked with fluorinated crosslinking groups and which has hydrophilic functional groups, said crosslinked fluorocarbon polymeric composition being derived from an uncrosslinked fluorocarbon polymeric composition containing a functional group selected from the group consisting of a sulfonyl halide, a carbonyl halide, a group that can be converted to a sulfonyl halide and a group that can be converted to a carbonyl halide; wherein the crosslinked fluorocarbon polymeric composition having hydrophilic functional groups has the formula:

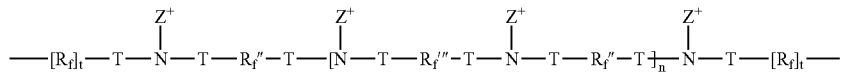

is covalently bonded through the $R_f$ groups, each to a CY group of a fluorocarbon polymeric composition of the formula:

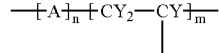

wherein A is a polymeric group derived from at least one fluorine-containing polymerizable monomer, n is an integer that can be 0, 1 or greater than 1, m is an integer of at least 1 and Y is hydrogen or halogen wherein at least one Y is a fluorine; T is a carbonyl or sulfonyl group; $R_f$ is a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; $R_f''$ and $R_f'''$ can be the same or different and can be a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon polymeric composition having hydrophilic functional groups; $Z^+$ is a proton or an organic or an inorganic cation and t can be 1 or 0.

22. An article having hydrophilic functional groups formed from a substrate comprising a fluorine-containing polymer having a portion of its surface contacted with and modified with a branched fluorocarbon polymer having a branch chain of the formula selected from the group consisting of:

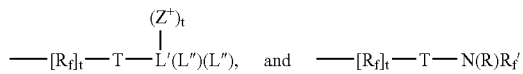

which is covalently bonded through the $R_f$ group to a CY group of a fluorocarbon polymeric composition of the formula:

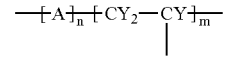

wherein A is a polymeric group derived from at least one fluorine-containing polymerizable monomer, n is an integer that can be 0, 1 or greater than 1, m is an integer of at least 1 and Y is hydrogen or halogen wherein at least one Y is a fluorine; T is a carbonyl or sulfonyl group; L' is C— or CH, L" is H or -$TR_f''$; $R_f$ is a $C_1$–$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $R_f'$ is $C_1$–$C_{20}$ linear, cyclic or branched fluoroalkyl group optionally containing one or more oxygen, nitrogen, chlorine, phosphorous hydrogen, and/or sulfur atoms and/or one or more sulfonyl or carbonyl groups, or a sulfonyl or carbonyl-containing fluoropolymeric group; $R_f''$ is $C_1$–$C_{20}$ linear, cyclic or branched fluoroalkyl radical optionally containing one or more oxygen, nitrogen, chlorine, hydrogen, phosphorous and/or sulfur atoms and/or one or more sulfonyl or carbonyl groups, or a sulfonyl or carbonyl-containing fluoropolymeric group; $Z^+$ is a proton or an organic or an inorganic cation; and t can be 1 or 0 and R is hydrogen or a substituted or unsubstituted alkyl or aryl group said branched fluorocarbon polymer being derived prior to being covalently bonded from a polymer composition containing a functional group selected from the group consisting of a sulfonyl halide, a carbonyl halide, a group tat can be converted to a sulfonyl halide and a group that can be converted to a carbonyl halide.

23. The article of claim 22 wherein the substrate is porous and the article is porous.

24. The article of claim 22 wherein the substrate is porous and the article is non-porous.

25. The article of claim 22 wherein the substrate is non-porous and the article is non-porous.

* * * * *